Oct. 26, 1965   E. J. COREY   3,214,671
INVERTER SYSTEM
Filed Sept. 13, 1962   4 Sheets-Sheet 1
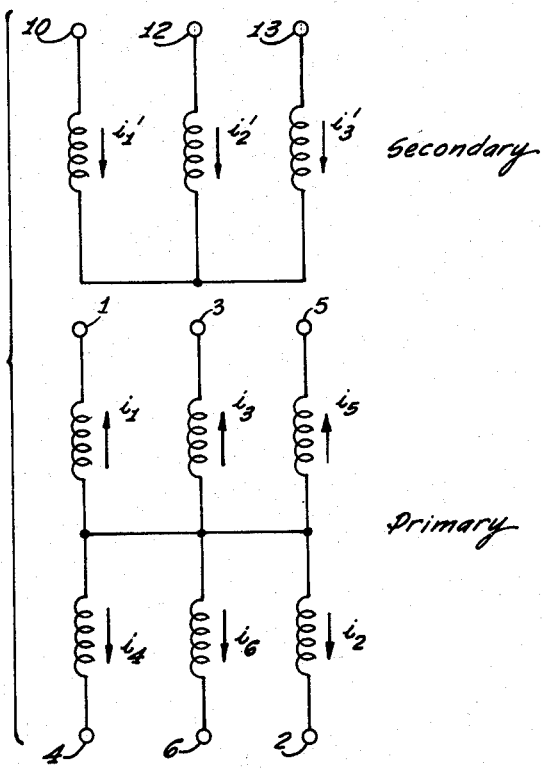
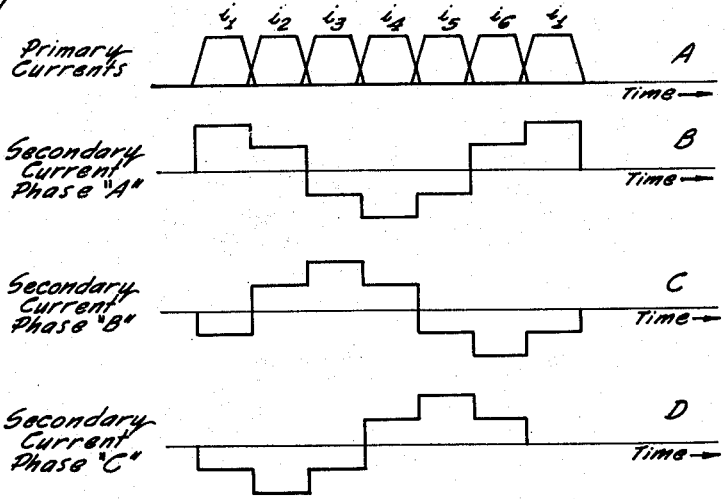
INVENTOR:
Edward J. Corey
By Lyon & Lyon
Attorneys Oct. 26, 1965     E. J. COREY     3,214,671
INVERTER SYSTEM
Filed Sept. 13, 1962     4 Sheets-Sheet 2
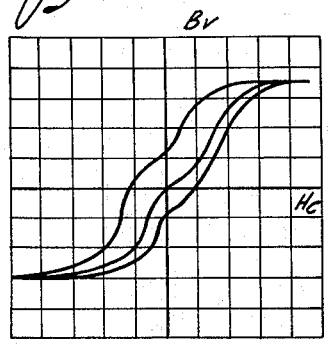
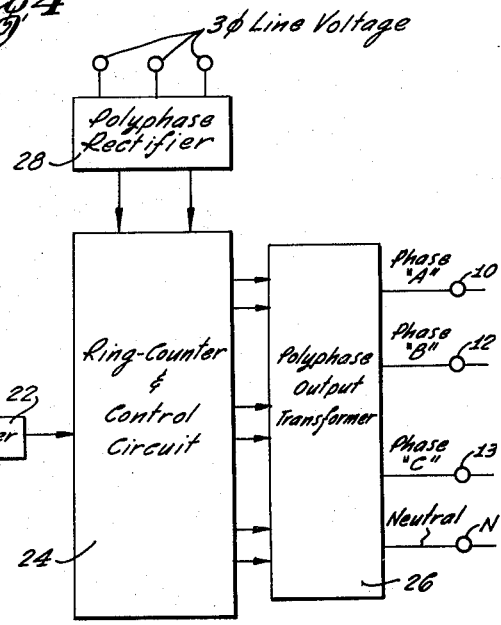
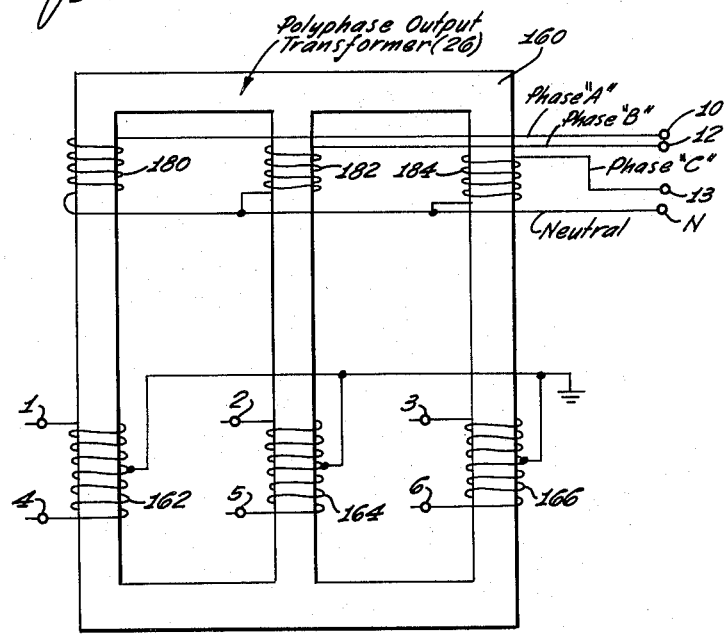
INVENTOR:
Edward J. Corey

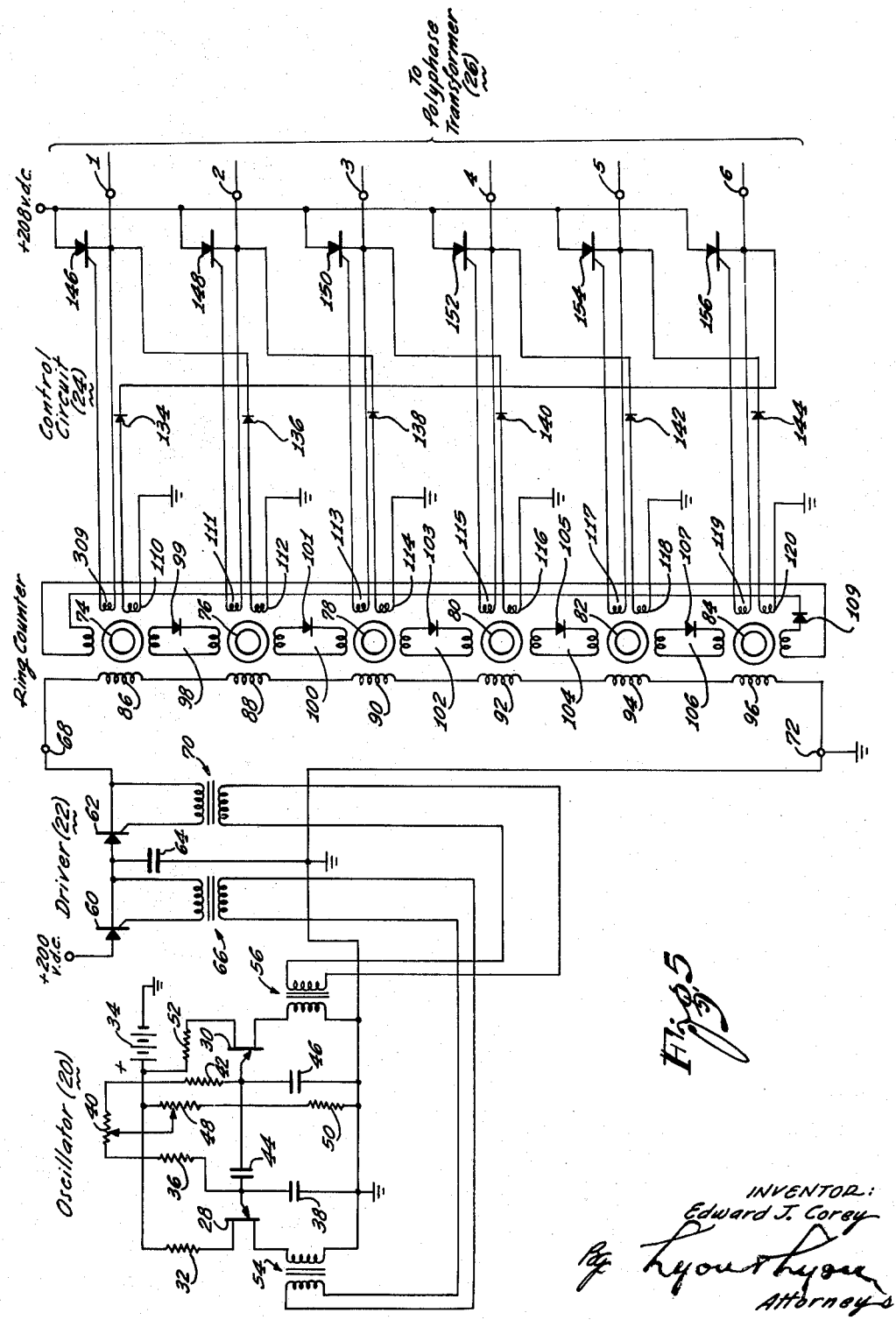

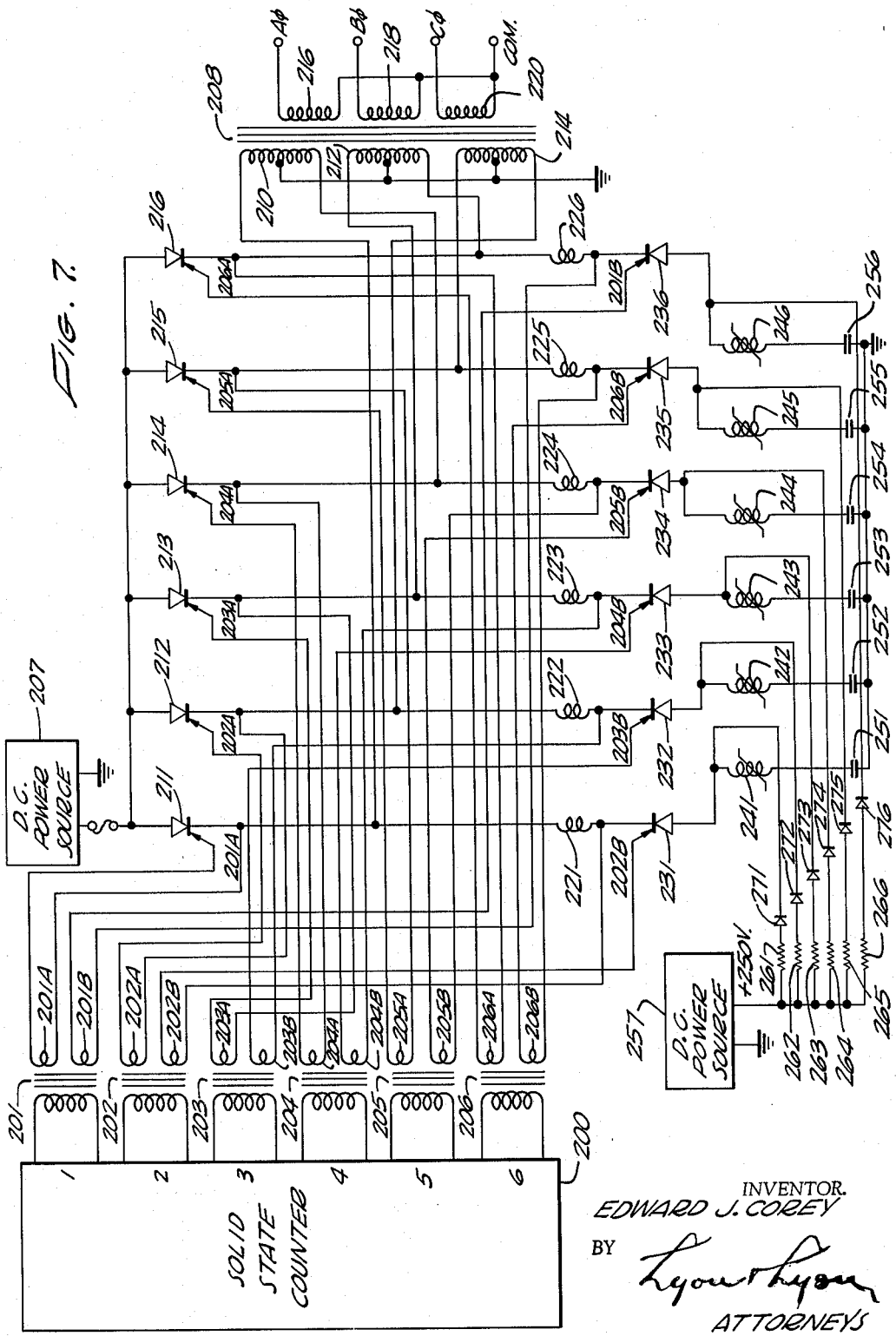

United States Patent Office 3,214,671
Patented Oct. 26, 1965

3,214,671
INVERTER SYSTEM
Edward J. Corey, Sepulveda, Calif., assignor to The Sierracin Corporation, Burbank, Calif., a corporation of California
Filed Sept. 13, 1962, Ser. No. 223,448
8 Claims. (Cl. 321—3)

The present invention relates to inverter systems for converting direct current power into alternating current power, or for converting alternating current power at a particular frequency into alternating current power at a different frequency.

This application is a continuation in part of application Serial No. 153,439, filed November 20, 1961, for this applicant, now abandoned.

The invention relates more particularly to a single phase or polyphase static inverter for producing single phase or polyphase output from a direct current, or alternating current, source; and for effectuating such a conversion without the need for mechanically moving parts, and in a more simplified and straightforward manner as compared with the prior art static inverters of this general type.

It is usual in one type of prior art inverter system to use rotating machinery, or mechanically vibrating elements, to convert direct current power into alternating current power. Although such prior art systems are suitable for some purposes, they suffer from many inherent limitations and drawbacks. The prior art rotating or vibratory mechanisms, for example, are noisy and present maintenance problems. They also exhibit a dependency on ambient temperature and other ambient conditions. These prior art inverters which use mechanically moving components, moreover, are relatively heavy and are susceptible to breakdown.

A second type of prior art inverter system, namely the static inverter, includes, for example, an electronic control circuit for converting direct current power from a direct current source into one or more series of rectangular waves. The electronic control circuit includes, for example, vacuum tube switches, such as Thyratrons; or solid state switches, such as transistors, silicon controlled rectifiers, and the like. These switches perform a desired switching function so as to convert the direct current voltage into the rectangular waves.

The present invention, as indicated above, is particularly concerned with an improved static inverter type of system for converting an alternating current voltage or a direct current voltage into a single phase or polyphase sinusoidal alternating current output. The system is capable, for example, of converting an alternating current voltage at a particular frequency into a polyphase or single phase sine wave output stabilized at the same frequency, or controlled to a different frequency, or range of frequencies.

The system of the invention is particularly suited for using solid state transistor rectifiers of the type presently referred to as silicon controlled rectifiers, and the embodiment of the invention to be described will be shown as incorporating such controlled rectifiers. It will become evident, however, as the description proceeds that other appropriately controlled switching devices may be used in the system of the invention.

In the prior art polyphase static inverter systems, it is the usual practice to develop each of the phases of the polyphase output power more or less independently, and by means of independent circuits. That is, a single phase sine wave is produced in each of a plurality of circuits in the prior art polyphase static inverter systems, and these sine waves are passed to the output terminals of the prior art system with independently stabilized amplitudes, and with particular mutual phase relationships, to make up the polyphase output power.

Serious problems arise, however, in the prior art static inverter systems referred to in the preceding paragraph. These problems include the requirement for precise voltage regulation of the sine wave in each phase, and the requirement for precise phase control of the waves in the separate phases. The prior art systems must also make use of "brute-force" band-pass filters, or the like, for converting the rectangular switching wave in each phase from that wave shape to the desired sinusoidal configuration.

It is, accordingly, an important object of the present invention to provide an improved and simplified static inverter system of the single phase or polyphase type, in which the problems encountered in the prior art systems of this general type are successfully overcome by means of a minimum of components and of relatively uncomplicated associated circuitry.

A further object of the invention is to provide such an improved static inverter system which is relatively inexpensive to construct and maintain, and which may be sold at a relatively low price.

Another object is to provide such an improved static inverter system in which polyphase sine wave output power is provided without the need for excessively complicated circuitry for amplitude or phase control, and without the need for bulky and complicated band-pass filter networks for phase shaping purposes.

The principal objectives of the invention are, therefore, to provide an improved static inverter system which is small in size and light in weight, which requires a minimum amount of maintenance, and which is capable of noise-free operation.

A feature of the invention is the provision of a static inverter system in which the output from a direct current or alternating current source is converted into one or more series of rectangular waves, which are introduced in a controlled manner to each of a plurality of primary windings of a polyphase output transformer, the inherent characteristics of the transformer itself being used to convert the rectangular waves into output voltages of almost pure sinusoidal configuration; so as to obviate the need for excessive regulation and filtering in order to achieve this purpose.

The static inverter of the invention is particularly suited for use in aircraft, or in other space vehicles. Such vehicles usually include an alternator driven by a turbine or jet engine. In the prior art, these alternators require an hydraulic speed regulating system to maintain constant frequency and voltage. In such an application, the static inverter of the invention obviates the need for such a speed regulating and serves to convert the unregulated alternator output power in the vehicle, for example, into single- or multi-phase, constant voltage constant frequency power.

The prior art static inverter systems referred to above usually utilize the principle of modulating the direct current voltage from the direct current power source within a particular frequency range to produce rectangular waves, and by then extracting the desired fundamental frequency by means of a "brute-force" band-pass filter network for each phase. This approach, however, as noted, is most inefficient and unstable, and is particularly unsatisfactory for large power outputs.

The system of the present invention converts the direct current output from the direct current source, or the rectified output from an alternating current source into a series of rectangular current pulses. This is achieved in the embodiment to be described by commutating action which is obtained by firing silicon controlled rectifiers in sequence. This commutation, unlike rotary converters, for example, can be made adjustable and variable, and it is not subject to the limitations inherent in rotating machinery.

Unlike the prior art systems the rectangular pulses are applied directly, in the system of the invention, to a polyphase transformer. The polyphase transformer has a common magnetic circuit, and the addition of pulses is achieved in the common magnetic circuit, so as to provide a nearly pure sine wave output, in one or more phases, and without the need for excessive "brute-force" filtering.

Any polyphase system is possible in the system of the invention. For example, the system is capable of producing single-phase, two-phase, three-phase, four-phase, or five-phase power, or multiples thereof.

The features of the static inverter system of the present invention include, therefore, the production of an essentially pure sine wave output with a minimum use of filtering or regulation networks. The output frequency of the system may be accurately established and precisely held at a desired value, as will be described. The system is eminently and inherently simple in its concept and construction. The system produces good voltage regulation in the presence of input power variations and/or output load variations. As will also be evident from a consideration of the following description, individual control and adjustment of each phase in the system of the invention is feasible.

Further features and advantages of the invention may best be understood by a consideration of the following description, when taken in conjunction with the accompanying drawings, in which:

FIGURE 1 is a schematic representation of a polyphase transformer suitable for use in the inverter system of the present invention;

FIGURE 2 shows a series of curves useful in describing the operation of the transformer illustrated schematically in FIGURE 1;

FIGURE 3 is a B—H characteristic curve of the magnetic circuit of a typical polyphase transformer;

FIGURE 4 is a block diagram of a static inverter system which incorporates the teachings of the present invention;

FIGURE 5 is a circuit diagram of certain components of the system of FIGURE 4 and incorporating the concepts of the present invention; and FIGURE 6 is a three-phase transformer constructed to be incorporated into the system of FIGURE 4 and to operate in conjunction with the circuitry of FIGURE 5.

FIGURE 7 is a circuit diagram of another embodiment of the invention.

As noted above, the improved static inverter system of the present invention makes use of the characteristics of reactor means, which may be combined as a polyphase transformer, to convert the rectangular current waves produced by a switching action in the system into an output on one or more phases of almost pure sinusoidal configuration. In the embodiment of the invention to be described, for example, the rectangular waves produced by the switching action in the system are selectively and controllably introduced to the primary windings of a polyphase transformer. Rectangular current pulses are thereby selectively caused to flow in successive primary windings of the polyphase transformer. These rectangular current pulses combine, in a manner to be described, to produce a single-phase or polyphase output of essentially sinusoidal configuration.

In the system of the present invention, therefore, the transformation from the rectangular switching signals to the polyphase or single-phase sine wave output is achieved in the reactor, such as the polyphase transformer, rather than by external means. Therefore, the need for "brute-force" by-pass filtering networks, or other wave shaping means, is obviated.

Also, the need for external individual amplitude control circuits for the different phases is eliminated in the system of the invention, because the switching currents themselves can be simply controlled by saturation and cut-off amplitude limiting to have a uniform amplitude regardless of variations in the source voltage, and the reactor is inherently self-regulating insofar as the phase displacements and amplitudes of the individual output phases are concerned.

Certain types of polyphase transformers lend themselves to the synthesization sine wave approximations from the selective application of input pulses to their primary windings. One such transformer is shown schematically in FIGURE 1. The transformer of FIGURE 1 includes a star-connected primary composed, for example, of six primary windings; and it also includes a Y-connected secondary composed, for example, of three secondary windings for the production of three-phase output power.

The primary currents in the six star-connected primary windings of the polyphase transformer, shown schematically in FIGURE 1, are designated respectively as $i_1$–$i_6$. The six primary windings are shown as connected to respective input terminals 1–6.

The secondary currents flowing in the Y-connected secondary windings are shown as $i_1'$, $i_2'$, $i_3'$, respectively. The three secondary windings are connected to terminals 10, 12 and 13, respectively. It is noted that a delta type of secondary would operate in essentially the same manner as the illustrated Y-connected secondary.

Now, if rectangular pulses are introduced in a successive, cyclic manner to the six primary windings of the transformer of FIGURE 1, the primary currents $i_1$–$i_6$ will flow in successive ones of the primary windings. Then the resulting magnetic flux in the magnetic circuit of the transformer will cause a three-phase output to be induced in the secondary windings. The load connected to the terminals 10, 12 and 13 will, then, cause the secondary currents $i_1'$, $i_2'$ and $i_3'$ to flow in the secondary windings.

The action of the transformer of FIGURE 1 may be better understood by a consideration of the following theoretical discussion. Neglecting the magnetizing current of the three-phase transformer of FIGURE 1, the ampere turns per leg of the transformer core will all be the same. Therefore:

$$N_1 i_1' + N_2(i_4 - i_1) = N_1 i_2' + N_2(i_6 - i_3)$$
$$= N_1 i_3' + N_2(i_2 - i_5) \quad (1)$$

where:

$N_1$ represents the number of secondary turns for each secondary winding.
$N_2$ represents the number of primary turns for each primary winding.

Expressed differently:

$$a i_1' + i_4 - i_1 = a i_2' + i_6 - i_3 = a i_3' + i_2 - i_5 \quad (2)$$

where: $a$ is the turns ratio.

Also by Kirchhoff's law:

$$e_1' + e_2' - e_3' = 0 \quad (3)$$

where: $e_1'$, $e_2'$, $e_3'$ are the instantaneous secondary voltages.

Neglecting leakage reactance:

$$(i_1' + i_2' + i_3')r = 0 \quad (4)$$

where: $r$ is the resistance of each secondary winding.

Solving Equations 2 and 4 simultaneously, we obtain the following expressions:

$$a i_1' = +\tfrac{2}{3} i_1 + \tfrac{1}{3} i_2 - \tfrac{1}{3} i_3 - \tfrac{2}{3} i_4 - \tfrac{1}{3} i_5 + \tfrac{1}{3} i_6 \quad (5)$$

$$a i_2' = -\tfrac{1}{3} i_1 + \tfrac{1}{3} i_2 + \tfrac{2}{3} i_3 + \tfrac{1}{3} i_4 - \tfrac{1}{3} i_5 - \tfrac{2}{3} i_6 \quad (6)$$

$$a i_3' = -\tfrac{1}{3} i_1 - \tfrac{2}{3} i_2 - \tfrac{1}{3} i_3 + \tfrac{1}{3} i_4 + \tfrac{2}{3} i_5 + \tfrac{1}{3} i_6 \quad (7)$$

Therefore, when current pulses, such as shown in the curve A of FIGURE 2 are selectively caused to flow in successive ones of the primary windings of the transformer of FIGURE 1, these pulses are combined in the transformer to produce secondary currents, as shown by the curves B, C and D of FIGURE 2. These secondary currents, as shown in FIGURE 2, approximate a sine wave in each phase, and the approximate sine waves are displaced 120 degrees from one another for the production of usual three-phase power.

Therefore, if a series of rectangular pulses are fed into the star-connected primary of the transformer shown schematically in FIGURE 1, and the pulses of the series are fed successively and recurrently to the six primary windings, the pulses will combine in the transformer to provide a three-phase output, and the waveform of each of the output phases will approximate a pure sine wave.

Although the curves B, C and D of FIGURE 2 shows a summation of pulses as approximating a sine wave in each phase, it should be pointed out that due to the hysteresis characteristics of the core of the transformer, the secondary waveform will much nearly approximate a sine wave in response to the rectangular pulse primary currents, than the incremental type of waves shown in FIGURE 2.

It will be appreciated in a consideration of a typical transformer, that in order to produce a sine wave output in any phase, the rate of change of the magnetic flux must be a sine wave. Since the permeability of the magnetic material changes with different flux densities, the magnetizing primary current which produces a sine wave of magnetic flux must have a waveform which is other than a sine wave.

The B—H curve of FIGURE 3 represents a typical hysteresis loop for the magnetic core of a three-phase transformer of the type shown schematically in FIGURE 1. With such a characteristic, the rectangular wave current pulse flowing in each of the primary windings cooperates to produce a rate of change of the magnetic flux which closely approximates the desired sinusoidal shape. Therefore, the normal non-linear characteristics of the transformer itself are helpful in the transformation of the rectangular pulse primary currents into outputs of essentially pure sine wave form.

It will be noted that the cross-over region of the B—H curve of FIGURE 3 has characteristics such that when the primary magnetizing currents are a combination of a fundamental, and third and fifth harmonics, an essentially pure sine wave of voltage will be induced in the secondary windings. The rectangular shaped primary currents flowing in the primary windings are rich in these harmonics, so that the primary currents required for pure sine wave secondary voltages are approximated by the rectangular shaped pulses introduced to the primary windings. In addition, the harmonics necessary for essentially pure sinusoidal secondary voltages are supplied in the polyphase transformer by the secondary currents flowing in the secondary windings.

Therefore, in a polyphase transformer with usual core characteristics, the pulses of curve A in FIGURE 2 will combine to form secondary voltages approaching pure sine wave form; rather than with the incremental, stepped configuration of the curves B, C and D of FIGURE 2.

The polyphase transformer of FIGURE 1, therefore, in practical use, distorts the secondary voltages induced from the combined effects of the rectangular pulses of primary current, in such a manner that nearly pure secondary sine waves are produced in response to the rectangular waves of primary currents.

Therefore, the use of such a transformer in the static inverter system to be described, permits rectangular switching current waves to be transformed into desired secondary output sine waves without the need for "brute-force" filtering. Moreover, the use of such a transformer, permits all the input switching current waves to cooperate in the production of each phase of the sinusoidal secondary output, so that there is no tendency for relative amplitude variations to occur in the individual phases of the output. This precludes any need for external amplitude regulating circuits for the individual phases. Also, the inherent characteristics and construction of the polyphase transformer of FIGURE 1 assures that the output phases will have the desired mutual phase displacement, without the need for external phase regulation circuits.

The generation of the rectangular primary current waves can be achieved by many types of devices. For example, gas controlled discharge devices, such as Thyratrons can be used. Moreover, solid state devices, such as transistors, silicon controlled rectifiers, and the like can also be used. In fact, the most efficient mode of operation for transistors and controlled rectifiers is to switch them on and off, as occurs in the normal operation of the static inverter system of the invention. The silicon controlled rectifiers is the presently preferred solid state device because of its higher voltage and larger current capability, as compared with other solid state devices. The embodiment to be described herein incorporates silicon controlled rectifiers.

The embodiment of the invention shown in block form in FIGURE 4 includes an oscillator 20 and a driver stage 22. The oscillator 20 and driver stage 22 may be of any appropriate construction and design, and these stages apply a series of pulses to a ring counter in a control circuit 24.

The output signals from the ring counter are used to control a plurality of switching devices in the circuit 24. The control circuit 24, in the embodiment to be described in conjunction with FIGURE 5, embodies solid state switching devices such as silicon controlled rectifiers. However, it will be apparent that any other suitable switching devices may be used.

The function of the switches in the control circuit 24 is to convert applied direct current power into rectangular current pulses, and to selectively apply the current pulses to the different primary windings of the polyphase output transformer 26. The polyphase output transformer produces a three-phase output, for example, across the respective terminals 10–12, 12–13 and 13–10. A neutral terminal (N) can also be provided at the output of the polyphase transformer.

The direct current power for the control circuit 24 may be derived from a polyphase alternating current in line voltage through a polyphase rectifier system 28. The polyphase rectifier system may have any appropriate form, and since such rectifiers are extremely well known to the art, the internal circuitry thereof will not be described in detail.

The polyphase rectifier 28 serves, for example, to rectify the three-phase input from the polyphase line. It will be understood, of course, that the direct current potential for the control circuit 24 may be derived from a battery, or any other appropriate direct current source.

In the illustrated embodiment, and when the system is installed in an aircraft, the three-phase line voltage from the aircraft alternator may be used as an input for the polyphase rectifier 28. Since the three-phase input is merely rectified to provide a desired direct current voltage, the fact that the frequency of the input may vary with engine speed has no effect on the frequency of the three-phase output derived from the polyphase output transformer 26. Therefore, in such a particular application, a constant frequency polyphase output may be derived from a variable frequency input, without any need for constant speed drives, or for other relatively heavy and bulky mechanical devices.

It will become evident as the present description proceeds, that the frequency of the three-phase output from the polyphase output transformer 26 is dependent only on the repetition frequency of the pulses produced by the oscillator and driver 20. Since the oscillator and driver can be made variable in frequency, the overall system is readily variable in frequency. The multi-phase output from the system, is particularly suited, therefore, to drive synchronous type motors, and the system provides an excellent source for variable speed drive of such motors.

The embodiment of the system shown in block form in FIGURE 4 is illustrated in circuit detail in FIGURE 5. As illustrated in FIGURE 5, the oscillator 20 includes a pair of unijunction transistors 28 and 30. These transistors may be of the type, for example, presently designated 2N491.

The first base electrode of the transistor 28 is connected to a resistor 32 which, in turn, is connected to the positive terminal of a source of unidirectional potential 34. The source 34 may, for example, be a battery. The negative terminal of the source 34 is connected to a point of reference potential, such as ground. The resistor 32 may have a resistance, for example, of 220 ohms. The source 34 may have a potential of 28 volts.

The emitter electrode of the transistor 28 is connected to the junction of a resistor 36 and a capacitor 38. The resistor 36 is connected to one terminal of a potentiometer 40, the other terminal of which is connected to the resistor 42. The emitter electrode of the transistor 28 is also connected to a capacitor 44, and the capacitor 44 is connected to the emitter electrode of the transistor 30 and to a capacitor 46. The capacitor 38 and the capacitor 46 are both connected to the point of reference potential, such as ground.

The resistor 36 may have a resistance, for example, of 10 kilo-ohms, the potentiometer 40 may have a resistance of 5 kilo-ohms, and the resistor 42 may have a resistance of 10 kilo-ohms. The capacitors 38, 44 and 46 may, for example, each have a capacity of .1 microfarad.

The movable arm of the potentiometer 40 is connected to the movable arm of a potentiometer 48. The potentiometer 48 is connected to the positive terminal of the source 34 and to a grounded resistor 50. The potentiometer 48 may have a resistance of 5 kilo-ohms, and the resistor 50 may, for example, have a resistance of 10 kilo-ohms. These elements form a voltage divider across the source 34.

The first base electrode of the transistor 30 is connected through a resistor 52 to the positive terminal of the source 34. The resistor 52 may have a resistance, for example, of 220 ohms.

The second base electrode of the transistor 28 is connected to one terminal of the primary winding of a coupling transformer 54. The second base electrode of the transistor 30 is connected to a terminal of the primary winding of a coupling transformer 56. The other terminal of the primary winding of the transformer 54, and of the primary winding of the transformer 56, are both grounded. The oscillator circuit 20 of FIGURE 5 is actually a pair of usual transistor oscillators synchronized with one another. The oscillator circuit 20 supplies output pulses to the driver stage 22 by way of the transformers 54 and 56 which are respectively 180 degrees out of phase with one another.

The driver stage 22 includes a first silicon controlled rectifier 60 and a second silicon controlled rectifier 62. These silicon controlled rectifiers may be of any suitable known type. The anode of the silicon controlled rectifier 60 is connected to the positive terminal of a 200 volt source of direct current potential, for example. The cathode of the silicon controlled rectifier 60 is connected to a capacitor 64. The capacitor 64 may have a capacity, for example, of .05 microfarad. The other terminal of the capacitor 64 is grounded.

The stage 22 also includes a first coupling transformer 66, the primary of which is connected to the secondary of the transformer 54 of the oscillator circuit 20. The secondary of the transformer 66 is connected to the gate electrode of the silicon controlled rectifier 60 and to the capacitor 64.

The anode of the silicon controlled rectifier 62 is connected to the capacitor 64, and the cathode of the silicon controlled rectifier 62 is connected to an output terminal 68.

The driver stage 22 includes a second coupling transformer 70, the primary of which is connected to the secondary of the transformer 56. The secondary of the transformer 70 has one terminal connected to the gate electrode of the silicon controlled rectifier 62, and the other terminal is connected to the cathode of the silicon controlled rectifier 62. The driver stage 22 includes a second output terminal 72 which is grounded.

The ring counter of the control circuit 24 includes, for example, a plurality of ring-shaped magnetic cores 74, 76, 78, 80, 82 and 84. The annular cores each have a plurality of windings associated therewith in accordance with usual magnetic switching practices, and they exhibit essentially rectangular hysteresis characteristics. Moreover, the cores have high retentivity, so that when they are magnetized in a particular direction they retain the resulting magnetic characteristics until they are magnetized in the opposite direction.

The cores 74, 76, 78, 80, 82 and 84 are connected in well known ring counter manner as a magnetic switching system. The cores have respective primary windings 86, 88, 90, 92, 94 and 96, and these primary windings are connected in series across the output terminals 68 and 72 of the driver stage 22.

The operation of the system of FIGURE 5, as thus far described, is as follows: The oscillator circuit 20 oscillates at a predetermined frequency to apply out-of-phase pulses at a given repetition rate to the driver stage 22. The repetition frequency of the pulses may, for example, be of the order of 2400 cycles. The occurrence of a pulse of a given polarity across the secondary of the transformer 54 causes the transformer 66 to render the silicon controlled rectifier 60 conductive. The conductivity of the silicon controlled rectifier 60 causes the capacitor 64 to charge up to a value of, for example, 200 volts. During the interval between the pulse applied to the transformer 60 and the next succeeding pulse, the out-of-phase pulse applied to the transformer 70 causes the silicon controlled rectifier 62 to become conductive, so that the capacitor 64 discharges through the series-connected primary windings 86, 88, 90, 92, 94 and 96 of the ring counter.

In the above described manner, the capacitor 64 is recurrently charged, and then discharged through the primary windings of the ring counter. This charging and discharging of the capacitor 64 is at a rate determined by the frequency of the oscillator 20. The frequency of the oscillator may be controlled, for example, by the appropriate adjustment of the potentiometers 40 and 48. The fixed quantity of charge that is used for each cycle minimizes any false switching signals. The frequency of the oscillator 20 is the only factor that determines the frequency of the output of the system of FIGURE 5, and this frequency can be held constant to very close tolerances.

The annular magnetic cores 74, 76, 78, 80, 82 and 84 are inter-coupled by windings 98, 100, 102, 104, 106 and 108; and through respective diodes 99, 101, 103, 105, 107 and 109. This inter-coupling is such that whenever a core is caused to be magnetized, or "turned over," from a first to a second state, the associated coupling windings causes the next succeeding core likewise to be "turned over."

As an initial condition, the cores 74, 76, 78, 80 and 82 are magnetized in a direction, such that the current flow through the associated primaries 86, 88, 90, 92 and 94 has no effect on the magnetism of the cores. However, the core 84 is magnetized in the opposite direction.

Therefore, the pulse of current through the primary 96 causes the magnetism in the core 84 to "turn over." The associated coupling winding 108, causes the magnetism in the core 74, likewise, to "turn over." Therefore, the next pulse of current through the primary windings 86, 88, 90, 92, 94 and 96 has no effect on any of the cores, except the core 74. In this manner, the cores are caused successively to change their magnetic state from one polarity to the other, in response to each successive pulse of discharge current through the series-connected primaries.

The annular magnetic cores 74, 76, 78, 80, 82 and 84 have respective pairs of output windings associated therewith. These respective pairs of output windings are designated 309 and 110, 111 and 112, 113 and 114, 115 and 116, 117 and 118, 119 and 120. Each time the magnetic state of a core is changed from one polarity to the other, a corresponding voltage is induced across each of the output windings of the associated pair.

The output windings 309, 111, 113, 115, 117 and 119 are respectively connected across the gate and cathode electrodes of a corresponding plurality of silicon controlled rectifiers 146, 148, 150, 152, 154 and 156.

The anodes of the silicon controlled rectifiers are all connected to the positive terminal of a 208-volt direct current source, for example. This source may, for example, be the polyphase rectifier 28 of FIGURE 4. The cathodes of the silicon controlled rectifiers 146, 148, 150, 152, 154 and 156 are connected respectively to the input terminals 1, 2, 3, 4, 5 and 6 of the primary windings of the polyphase output transformer 26 of FIGURE 6.

One side of the winding 110 is grounded, and the other side is coupled through a diode 134 to the cathode of the silicon controlled rectifier 156. The windings 112, 114, 116, 118 and 120, likewise, have one side grounded. These latter windings are connected through respective diodes 136, 138, 140, 142 and 144 to the cathodes of respective ones of the silicon controlled rectifiers 146, 148, 150, 152, 154 and 156.

The polyphase output transformer 26, as shown in FIGURE 6, includes a magnetic core 160, having three legs for three-phase operation. A first center tapped primary winding 162 is mounted on a first leg, a second center tapped primary winding 164 is mounted on a second leg, and a third center tapped primary winding 166 is mounted on a third leg. The center taps of each of the primary windings are inter-connected, so that the resulting configuration is a star-connection of primary windings, similar to the connections shown schematically in FIGURE 2.

The transformer primary terminals 1 and 4 are connected to the opposite sides of the primary winding 162; the primary terminals 2 and 5 are connected to the opposite sides of the primary winding 164; and the terminals 3 and 6 are connected to the opposite sides of the primary winding 166. These primary terminals correspond, therefore, to the terminals shown in the schematic representation of FIGURE 2 as associated with the star-connected primary winding.

Therefore, as the silicon controlled rectifiers 146, 148, 150, 152, 154 and 156 are successively gated by the control circuit 24, a first current pulse flows in through the upper portion of the primary winding 162, then a second current pulse flows in through the upper portion of the primary winding 164, then a third current pulse flows in through the upper portion of the primary winding 166. These current pulses are then followed by a current pulse in the opposite direction through the lower portion of the primary winding 162; which, in turn, is followed by a pulse in the opposite direction through the lower portion of the primary winding 164; which, in turn, is followed by a pulse in the opposite direction through the lower portion of the primary winding 166. The above-mentioned sequence occurs repeatedly throughout the operation of the system.

When, for example, the current through the winding 88 associated with the core 76 causes the magnetic state of the core to change, several things happen.

Firstly, the resulting output pulse across the winding 111 causes the silicon controlled rectifier 148 to fire, so as to produce a pulse of current through the upper portion of the transformer primary 164 in FIGURE 6.

Secondly, the resulting output pulse across the winding 112 is applied to the cathode of the previously conducting silicon controlled rectifier 146 to render the same non-conductive.

Thirdly, the resulting pulse in the coupling winding 100 sets the core 78, so that the latter core will be caused to change its magnetic state by the next pulse down through its primary winding 90.

In this manner, all the silicon controlled rectifiers 146, 148, 150, 152, 154 and 156 are successively fired and then successively turned off.

The magnetic core 160 of the polyphase output transformer 26 also includes secondary windings 180, 182 and 184. These secondary windings are wound on the different legs of the core. The secondary windings have one of their sides Y-connected to a common lead which, in turn, is connected to a neutral output terminal (N) of the system. The other sides of the secondary windings 180, 182 and 184 are respectively connected to output terminals 10, 12 and 13. The three-phase output power is developed across the output terminals, as described above in conjunction with FIGURE 2.

The output of the oscillator circuit 20, whose frequency, for example, is 2400 cycles per second, is divided therefore by the ring counter into six drive signals. Each drive signal consists of series of pulses occurring, for example, at a rate of 400 pulses per second. Each drive signal is applied to a different one of the silicon controlled rectifiers in the control circuit 24.

Each silicon controlled rectifier in the control circuit 24 is conductive, therefore, for only one-sixth of each operating cycle and is nonconductive for the remainder of the cycle. That is, in the example above, each silicon controlled rectifier is conductive for 416 microseconds, and is nonconductive for 2080 microseconds.

This provides more than enough time to turn off each of the silicon controlled rectifiers, and to permit cooling of the junctions. As is well known, the heating of the junctions is a limiting factor on the power handling capabilities of the silicon controlled rectifiers.

Each silicon controlled rectifier in the control circuit 24 is rendered conductive by a pulse applied to its gate electrode from the ring counter, as mentioned above. As also described, each silicon controlled rectifier is subsequently de-activated by a pulse applied to its cathode.

Therefore, under the action of the control circuit 24, the silicon controlled rectifiers in the control circuit are successively activated. As each silicon controlled rectifier is activated, a corresponding rectangular pulse of current is caused to flow through a corresponding primary winding of the polyphase transformer 160.

In the described manner, therefore, the silicon controlled rectifiers of the control circuit are successively activated and de-activated to cause current magnetizing pulses to be introduced in the desired controlled manner to the primary windings of the polyphase output transformer 26. The rectangular magnetizing current pulses in the polyphase transformer combine in the common magnetic circuit to cause sinusoidal secondary voltages to be induced in the secondary windings, as described, so that the desired three-phase, or any other polyphase, or single-phase output is derived.

As described above, the system of the present invention makes use of the rectangular shaped switching current pulses produced by the silicon controlled rectifiers 146, 148, 150, 152, 154 and 156 to cause the polyphase output transformer 180 to generate essentially pure sine waves across its secondary windings. This transformation from rectangular to sine wave is made in the transformer itself, and no attempt is made, by "brute-force" methods and networks, to shape the primary magnetizing currents into sine waves. The resulting outputs have a sufficiently pure sine wave configuration for most applications. However, simple low-pass filtering means may be used if so desired to remove any slight distortions that may be contained in the multi-phase output.

FIGURE 7 is a block-schematic diagram of a preferred embodiment of this invention. It comprises a solid state counter 200 which may be of the type described previously or of any other suitable well-known types. This solid state counter 200 is continuously driven and successively applies an output to each one of the six transformers, respectively 201 through 206. Each one of these six transformers has two secondary windings, respectively 201A, 201B, 202A, 202B, 203A, 203B, 204A, 204B 205A, 205B, 206A and 206B.

The outputs on the secondary windings of the transformers are employed to drive a power output switching circuit. This includes a power source 207 which may be on the order of 180 volts. This power source is connected to the anodes of the respective silicon controlled rectifiers 211, 212, 213, 214 and 215. The respective secondary windings 201A through 206A are respectively connected between the control grid and cathode of the respective silicon controlled rectifiers 211 through 216. There is also provided a polyphase output transformer 208 which is of the identical type as the transformer 26 shown in FIGURE 6. This transformer has three center-tapped primary windings, respectively 210, 212, and 214, and three output windings, respectively 216, 218 and 220. The center taps of the primary windings are all connected together and to ground. One side of primary winding 210 is connected to the cathode of the silicon controlled rectifier 211, the other side of the primary winding is connected to the cathode of silicon controlled rectifier 214. One side of primary winding 212 is connected to the cathode of silicon controlled rectifier 213, the other side of the primary winding is connected to the cathode of silicon controlled rectifier 216. One side of the primary winding 214 is connected to the cathode of the silicon controller rectifier 215, the other side of this primary winding is connected to the cathode of silicon controlled rectifier 212. One side of all of the secondary windings is connected together and serves as a common. The three phases of the outputs are derived from the respective other sides of the windings 216, 218 and 220.

The respective cathodes of the silicon controlled rectifiers 211 through 216 are each connected to one side of the respective inductances 221 through 226. The other end of the respective inductances 221 through 226 are each connected to a cathode of the respective silicon controlled rectifiers 231 through 236. The secondary winding 201B is connected between the cathode and control electrode of the silicon controlled rectifier 236. The respective secondary windings 202B through 206B are connected between cathode and control electrode of the respective silicon controlled rectifiers 231 through 235.

Each one of the anodes of the respective silicon controlled rectifiers 231 through 236 is connected through a variable inductor, respectively 241 through 246 to a capacitor 251 through 256. The other side of these capacitors is connected to ground. A charging circuit for these capacitors comprises a D.C. power source 257 which connects to one side of the respective resistors 261 through 266. The other end of each one of the respective resistors 261 through 266 is connected to an anode of the respective diodes 271 through 276. The respective cathodes of the diodes 271 through 276 are respectively connected to the variable inductors respectively 241 through 246.

The operation of the circuit shown in FIGURE 7 is as follows. Each output pulse from the solid state counter 200 is applied through the transformer 201 to one of the silicon controlled rectifiers 211 through 216 and to one of the silicon controlled rectifiers 231 through 236. Assume that the solid state counter contains its number 2 count. The winding 202A which is connected to the silicon controlled rectifier 212 applies a pulse thereto to render it conductive. As a result, a current pulse is permitted to flow from the D.C. power source 207 through the lower half of the center tap winding 214. The secondary winding 202B which is connected to the silicon controlled rectifier 231 applies a pulse thereto which renders it conductive. This enables the capacitor 251 to discharge through this silicon controlled rectifier through the inductances 221 and through the upper half of a transformer winding 210. As a result, the cathode of the silicon controlled rectifier 211 is rendered sufficiently positive to cause it to become non-conductive. Upon the occurrence of the third count of the solid state counter 200 a pulse is applied through winding 203A and through the winding 203B to cause both silicon controlled rectifiers 213 and 232 to become conductive. As a result, the silicon controlled rectifier 212 is turned off. The respective silicon controlled rectifiers 231 through 236 which are turned on for the purpose of enabling capacitors 251 through 256 to be discharged therethrough are turned off upon the termination of the discharge pulse. Each one of the capacitors are charged up from the power source 257 through the resistor and diode connected thereto.

It should therefore become apparent that as the solid state counter 200 progresses through its successive count states rectangular current pulses are applied to the transformer 208, first through the upper half of the winding 210, then to the lower half of the winding 214. Next to the upper half of the winding 212, then to the lower half of the winding 210. Next to the upper half of winding 214 and thereafter to the lower half of the winding 212. With this pulsing sequence and with a transformer of the type described, a three phase sinusoidal current output is derived from the transformer.

While a particular embodiment of the invention has been shown and described, modifications may be made, and it is intended in the following claims to cover all such modifications as fall within the scope of the invention.

What is claimed is:

1. An inverter system for converting direct current voltage from direct current source into a polyphase alternating current output, said inverter system comprising a polyphase output transformer including a magnetic core, a plurality of primary windings wound on said core, and a plurality of secondary windings wound on said core, a plurality of silicon controlled rectifiers, each having an anode, cathode and control electrode, means connecting the anodes of all of said plurality of silicon controlled rectifiers through said direct current source, means connecting the cathode of each of said silicon controlled rectifiers to a respective one of said primary windings, means for generating a sequence of first and second pulses, means for sequentially applying said first pulses to the control electrodes of said silicon controlled rectifiers to render them sequentially conductive, means connected to the cathode of each of said plurality of silicon controlled rectifiers, for rendering a conducting one of said silicon controlled rectifiers nonconductive in response to the application of one of said second pulses, and means for applying said second pulse to said means simultaneously with the application of a first pulse to the control electrode of the next succeeding silicon controlled rectifier.

2. An inverter system for converting the direct current voltage from a direct current source into a polyphase alternating current output, said inverter system comprising a polyphase power output transformer including a magnetic core, a plurality of primary windings wound on said core, and a plurality of secondary windings wound on said core, commutating means coupled to the direct current source and to the primary windings of said transformer and including a plurality of silicon controlled rectifiers, means coupling each of said silicon controlled rectifiers between said direct current source and a respective one of said plurality of primary windings, means for generating a sequence of first and second pulses, means for sequentially applying said first pulses to said silicon controlled rectifiers to render them sequentially conductive, capacitor means, means to apply said second pulses to said capacitor means, said capacitor means responsive to the application of said second pulses to render nonconductive the silicon controlled rectifier which is conductive at the time one of said first pulses is applied to the next succeeding silicon controlled rectifier to render it conductive.

3. An inverter system for converting direct current voltage from direct current source into a polyphase alternating current output, said inverter system including a polyphase power output transformer having a magnetic core, a plurality of primary windings wound on said core, and a plurality of secondary windings wound on said core, means for applying pulses of current to a different one of said primary windings in sequence from said direct current source including a plurality of silicon controlled rectifiers, each of said silicon controlled rectifiers being connected between said direct current source and a respective one of said plurality of primary windings, counting means for generating a sequence of first and second pulses, means for applying successively said first pulses to said silicon controlled rectifiers to render them sequentially conductive, a plurality of silicon controlled rectifier turnoff means, each of said turnoff means being connected to one of said silicon controlled rectifiers, and means for applying each one of said second pulses to the one of said silicon controlled rectifier turnoff means which is connected to a silicon controlled rectifier which is conducting, simultaneously with the application of a first pulse to the next succeeding silicon controlled rectifier to turn off said previously conducting silicon controlled rectifiers.

4. The inverter system as recited in claim 3 wherein each said silicon controlled rectifier turnoff means includes a second silicon controlled rectifier, a capacitor, means for charging said capacitor, and means for connecting said capacitor in a discharge path including said second silicon controlled rectifier.

5. An inverter system for converting direct current voltage from a direct current source into a polyphase alternating current output, said inverter system including a polyphase power output transformer having a magnetic core, a plurality of primary windings wound on said core and a plurality of secondary windings wound on said core, a first and second plurality of silicon controlled rectifiers each of which has an anode, cathode and control electrode, means connecting said direct current source to the anodes of all said first silicon controlled rectifiers, means connecting the cathode of each of said first silicon controlled rectifiers to a respective one of the primary windings of said polyphase transformer, means connecting the cathode of each of said first silicon controlled rectifiers to the cathode of one of said second silicon controlled rectifiers, means for generating first and second pulses, a plurality of capacitors, means for charging each one of said plurality of capacitors, means for connecting each of said plurality of capacitors to the anode of one of said second silicon controlled rectifiers whereby it may discharge through said second silicon controlled rectifier, means for sequentially applying said first pulses to the control electrode of a different plurality of said first plurality of silicon controlled rectifiers to render them sequentially conductive, and means for applying a second pulse to the control electrode of the second silicon controlled rectifiers whose cathode is connected to the cathode of the conducting first silicon controlled rectifier to render said second silicon controlled rectifier conductive whereby its respective capacitor discharges to render said first silicon controlled rectifier non-conducting.

6. The inverter system of claim 2 wherein said power output transformer includes a magnetic core having three legs, six star-connected primary windings wound on respective ones of said legs, and three secondary windings wound on respective ones of said legs.

7. The inverter system of claim 6 in which said secondary windings are Y-connected.

8. The inverter system of claim 6 wherein said magnetic core has hysteresis characteristics such that a polyphase alternating current output of essentially sinusoidal waveform is produced across said secondary windings.

References Cited by the Examiner
UNITED STATES PATENTS

| | | | |
|---|---|---|---|
| 2,193,421 | 3/40 | Janetschke | 321—50 |
| 3,052,833 | 9/62 | Coolidge et al. | 321—45 |
| 3,060,363 | 10/62 | Jensen | 321—5 |
| 3,085,190 | 4/63 | Kearns et al. | 321—45 |
| 3,091,729 | 5/63 | Schmidt | 321—5 |
| 3,100,851 | 8/63 | Ross | 321—49 X |
| 3,118,106 | 1/64 | Robinson | 321—49 |

OTHER REFERENCES

"Static Inverter Delivers Regulated 3-Phase Power," by M. Lilienstein; published in Electronics (July 8, 1960), vol. 33; No. 28, pages 55–59.

LLOYD McCOLLUM, *Primary Examiner.*